Nov. 23, 1937.
J. E. MITCHELL
2,100,301
SELF CONTAINED BOLL COTTON EXTRACTING MACHINE
Filed May 18, 1936
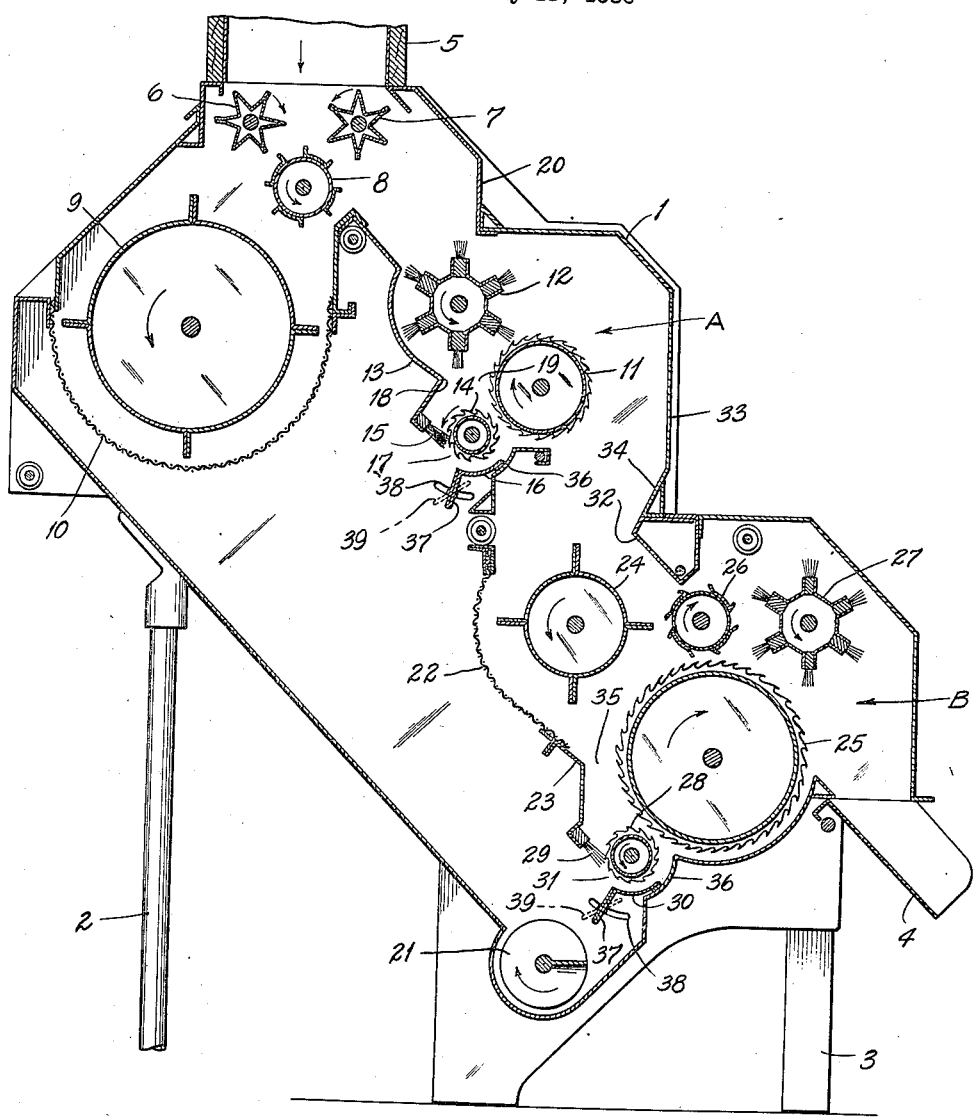
INVENTOR:
JOHN E. MITCHELL,
By Bruce S. Elliott
ATTORNEY.

Patented Nov. 23, 1937

2,100,301

UNITED STATES PATENT OFFICE 2,100,301

SELF-CONTAINED BOLL COTTON EXTRACTING MACHINE

John E. Mitchell, Dallas, Tex.

Application May 18, 1936, Serial No. 80,239

12 Claims. (Cl. 19—35)

The general object of my invention is to provide a self-contained boll cotton extracting machine having two or more sets of extracting units, and which shall be compact enough to mount on a gin stand within the space ordinarily available between the gin and the feeding mechanism which supplies a regulated stream of cotton to suit the capacity of the gin.

In a machine of the above character, each extracting unit includes an extracting saw cylinder, and it is one of the objects of the invention to provide a separate reclaiming saw cylinder to recover small lock cotton escaping with the hulls from each extracting cylinder, and to provide in connection with each reclaiming cylinder a hull discharge opening, which is preferably adjustable in size, so that the hull discharge openings from the reclaiming cylinders may be adjusted or regulated independently of each other to suit the capacity, character and size of the hulls, hull particles, etc., separated by the different extracting cylinders.

Another object of the invention is to provide an upper, or initial extracting unit in the operation of which only a portion of the hulls are separated from the cotton, while the other portion is designedly permitted to be carried along with the cotton engaged by the extracting cylinder. This operation, in itself, could be effected in various ways, but it is essentially characteristic of the present invention that hulls passing through with the cotton and delivered with the cotton to the succeeding extracting unit shall be in the same condition as the hulls separated from the cotton in the first extracting unit.

To this end, it is an important object of the invention to avoid any mechanical action on the hulls in separating them from the cotton in the first extracting unit, such as by the provision of the conventional kicker roll, and to so direct the mixed stream of cotton and hulls fed to the extracting cylinder that a portion of the hulls are, in a measure, forced to fall into engagement with the reclaiming cylinder associated with the extracting cylinder, and to be removed and discharged by the reclaiming cylinder, while other hulls and hull particles are simply carried around with the cotton without being acted upon at all, so that they are delivered with the cotton to the succeeding extracting unit in the same condition as when they entered the machine.

The advantage of such a procedure consists in the fact that each unit has only to separate a portion of the total quantity of hulls, and furthermore, the hulls passing with the cotton to the second extracting unit are left intact by the action of the first extracting unit, and thus the separation between the cotton and hulls in the second unit is effected quite as readily as is the case with the first extracting unit.

In practice I have found that the hulls are about equally divided in the first extracting unit, one-half of the total quantity fed into the machine escaping through the discharge opening past the extracting cylinder and being removed and discharged by the reclaiming cylinder, and the other portion being carried around by the extracting cylinder with the cotton and delivered to the second extracting unit.

Any mechanical means, such as a kicker roll, for enforcing a separation between the hulls and cotton in the first extracting unit, inevitably results in cutting and breaking a certain percentage of the hulls, with the result that the hulls that are not separated are badly shaled, or cut, as they are forced by the teeth of the saws against the rotation of the kicker roll, and the resulting shale, or small pieces of hull, are much more difficult to separate in the second extracting unit than are hulls which have not been so cut up, or damaged.

In the accomplishment of this latter object there is involved a further object of this invention, which is to provide a hull board associated with the extracting cylinder and so positioned and inclined as to direct an incoming regulated stream of mixed cotton and hulls toward the under rising side of the extracting cylinder. That is to say, the hull board is inclined substantially tangentially to the lower rising portion of the extracting cylinder; or, to be more accurate, if the line of the hull board were extended, it would pass through such lower portion of the cylinder in a manner to subtend an arc of the cylinder, instead of extending beneath and defining a space past the lower portion of the cylinder. The lower end of the hull board terminates approximately in a horizontal plane passing through the axis of the extracting cylinder and is positioned at a considerable distance from its rising side, so as to provide a relatively wide space or opening, across which the mixed cotton and hulls pass on their way to this side of the extracting cylinder, and through which a certain proportion of the hulls and small lock cotton are free to fall on the reclaiming saw cylinder positioned below this opening in doffing relation with the extracting cylinder.

For the better operation of this extracting unit, it is desirable to produce a relatively high velocity of the mixed cotton and hulls over the hull board which directs such mixture against the rising side of the extracting cylinder. To this end, another object of my invention consists in employing a rotary doffer which cooperates both with the hull board and with the extracting cylinder. At one side this doffer operates to propel the regulated stream of mixed cotton and hulls entering the machine at high velocity over the hull board, so that the cotton and hulls are thrown into engagement with the rising lower portion of the extracting cylinder, and as the path of the cotton and hulls is, as stated, substantially tangential to the lower rising portion of the extracting cylinder, a certain proportion of the hulls, not entangled with the cotton, are free to fall by gravity onto the reclaiming saw cylinder below, or to continue their downward course until thrown outward either by the teeth of the extracting cylinder, or by those of the reclaiming cylinder, neither of which has any tendency to engage the hulls at this stage.

I provide, in association with each of the reclaiming cylinders, an adjustable shield, concentric with the periphery of the cylinder, for regulating the size of the hull discharge opening which is provided between the bottom of a yielding member, or brush, cooperating with the cylinder, on one side and the outer termination, or edge, of the curved shield, on the other.

The arrangement of the two reclaiming saws operating independently of each other in connection with the extracting cylinders of the respective extracting units, and the provision of a hull discharge opening for each reclaiming cylinder, which openings are independently adjustable in size, embody important features of the invention, as each reclaiming cylinder will have about the same amount of hulls and small lock cotton escaping with them to handle, so that with extremely rough or hully cotton, there is no tendency to overload either of the reclaiming cylinders, and as the size of the hull discharge openings are regulated to suit the requirements of each unit, both are rendered more effective in recovering the small lock cotton escaping with the hulls.

The cotton and hulls carried around by the first extracting cylinder are discharged by gravity into the succeeding extracting unit. This unit comprises an extracting cylinder, preferably of considerably greater diameter than the first extracting cylinder, and other members cooperating therewith, to be described in detail later, together with a reclaiming saw cylinder functioning in the manner described in connection with the first extracting unit.

While the invention contemplates the use of additional extracting units, for ordinary purposes two are sufficient, and a machine with two units only is illustrated in the drawing.

In order to make clear the distinction between the principle of operation involved in the present invention and certain practices illustrated in the prior art, a brief reference will be made to two of my own prior patents as illustrating such prior practices.

In the Mitchell Patent No. 1,613,242, a reclaiming cylinder is shown for recovering small lock cotton escaping past an extracting cylinder.

In the Mitchell Patent No. 1,734,592, is disclosed a plurality of extracting units, the cotton being delivered from the extracting cylinder of one unit to the lower side of the extracting cylinder of the next succeeding unit, and so on.

The hulls discharged past each extracting cylinder escape through spaces defined by the extracting cylinders on the one hand and hull boards on the other, the hull discharge space past the first extracting cylinder being wider then the spaces defined between the hull boards and extracting cylinders of the succeeding units.

Experience has shown that the machine of this latter patent, while practicable in handling the ordinary run of cotton that contains only hulls, stems, etc., is altogether inadequate for handling bolly cotton, for the reason that in opening bolls to release the cotton, only a small percentage of the boll hulls are separated from each other, especially when the bolls are tough, or damp, in which event the hulls hang together and require a relatively wide space to fall through past the extracting cylinder. If this space (18 of the first extracting unit of the patent) is made wide enough to permit the free discharge of bolls that have been merely spread out to free the cotton, but with the hulls still hanging together, the space is too wide to hold the cotton, and a large portion of the cotton passes through with the hulls.

On the other hand, if the discharge space is closed up enough to prevent this loss of cotton, the working chamber is loaded up and the bolls and hulls will go over the top of the kicker roll, so that the same problem of separation has to be dealt with in the second extracting unit, and in any number of succeeding units. With the relatively wide space necessarily provided, therefore, for the escape of hulls past the first extracting cylinder, it is impossible to prevent a certain percentage of one-seed locks bouncing off the face of the extracting cylinder and escaping with the bolls; hence the necessity for the reclaiming saw disclosed in this prior patent.

Now it will be readily seen that by providing separate reclaiming saw cylinders to recover the small lock cotton from a plurality of streams of hulls discharged from a series of extracting units operating on the same regulated stream of cotton, and having independently adjustable hull-discharge openings from the separate reclaiming cylinders combined with the provision for the free passage of a portion of the hulls with the cotton from the first to the second extracting unit, that the machine can be readily adjusted to meet the conditions arising in handling bolly or hully cotton regardless of variations in the size and quantity of hulls. Moreover, by inclining the hull boards directly toward the teeth of the extracting cylinders, I insure that the mixed cotton, bolls and hulls will be delivered against the front, or rising, side of the saws of the extracting cylinders, while at the same time a space wide enough for the bolls and large hulls to fall freely through will be provided.

The modern high-speed gin has been increased in capacity to such an extent that much greater extracting capacity and more efficient extracting mechanism is required to supply it with seed cotton in proper condition for the best ginning results than was necessary with old-model gins, especially when handling boll cotton which is very bulky, or which contains a relatively small per cent. of cotton, or when it is necessary to extract sufficient cotton from snapped bolls which, in many cotton growing sections, frequently comprise a considerable portion of the cotton crop, which is due to the fact that early frosts often occur before the bolls have fully matured and opened. Many of these unopened, or only partly opened bolls merely have the cotton knocked out of them by the beaters of the machines through which they are passed, and the hulls are flared out full size.

As the stream of mixed cotton and hulls being acted upon in the working zone in front of the first extracting cylinder is of relatively great bulk, the importance, both of rapidly separating a large portion of these hulls from the cotton in the first extracting unit, and providing for the rapid and free movement of the balance of the hulls with the cotton to the second extracting unit, will be manifest, as in this manner each extracting unit has to deal with a portion only of the total quantity of hulls and bolls fed into the machine, with the result that a much closer separation between the cotton and hulls can be made. In fact, by avoiding the mechanical production of shale and small hull particles in the mixed cotton and hulls delivered to the second extracting unit, I have found that a practically complete separation between the cotton and hulls can be made in a machine employing two units.

Because of the limited space ordinarily available between the top of the gin stand and the feeding rolls which supply regulated streams to suit the capacity of the gins, many gin plants have resorted to the practice of what is known in the trade as "double extraction". This practice entails the use of a very large and expensive overhead extracting machine, mounted above the gin feeder rollers and the distributor which supplies the same. These machines operate on the mixed cotton, hulls and bolls in bulk as and when it is unloaded from the wagons.

While this practice has yielded some improvement in results, because of the inadequate capacity of extractors mounted on the gin stands, the excessive cost and larger building required for the overhead type of extracting machine has limited their use to a comparatively few plants. But even when used, the unregulated stream of mixed cotton, hulls, and other trash, fed to such machines by the wagon-unloading apparatus, brings about periodic overloading, which results in a considerable percentage of the hulls being shaled or cut, and the hull particles thus produced are very difficult to separate by the extracting machinery mounted on the gin stands.

To save this extra cost, and at the same time improve the results, I have provided by my present invention a self-contained machine having a plurality of separate extracting and reclaiming units, operating on the same stream regulated to suit the capacity of the gin stand on which the machine is mounted. This machine requires very little additional space over that required by ordinary extracting machines greatly inferior in capacity and efficiency. In fact, the extracting results obtained have been demonstrated to be superior to the best results obtainable with the double extractor combination referred to, involving the use of the large overhead extracting machines mounted on the gin stands.

A preferred embodiment of my invention is illustrated in the accompanying drawing in which the view is a cross section through a machine constructed according to the invention, the conventional driving mechanism for the various rotary members being omitted and the directions of rotations of these various members being indicated by arrows applied thereto.

Referring now to the drawing, the numeral 1 indicates, generally, the casing of the machine which is adapted to be supported by front and rear standards 2, 3, on the top of a gin into which the cleaned cotton from the machine is delivered from a spout, 4. The boll cotton supplied by a suitable distributor (not shown) to the hopper, 5, above each machine, is compressed by a pair of conventional feeding rollers, 6, 7, which, as usual, have a variable speed drive which is adjusted to feed the stream of boll cotton at a rate to suit the capacity of the gin located below the machine. Below the feeding rollers is mounted a directing cylinder, 8, which, as to its upper portion, throws the boll cotton to the farther side of a cleaning cylinder, 9, which forces the cotton over a curved screen, 10, to remove small trash therefrom after which it is thrown upward by the cleaning cylinder against the under side of the directing cylinder, 8, which operates to deliver it to the first or upper extracting unit. The cylinder 8 thus has the combined functions of a directing and discharge cylinder.

The elements just described may be considered as conventional, and in themselves form no part of the present invention. It may be stated, however, that the cleaning cylinder 9 is rotated at such velocity that the impact of its blades with unopened bolls will cause such bolls to be opened and the cotton knocked therefrom, and unless the bolls are damp, or quite tough, will break the shells of the bolls apart.

The first extracting unit, which I will indicate, generally, by the letter A, comprises a relatively small extracting saw cylinder, 11, a combined directing cylinder and doffer, 12, a hull board, 13, a reclaiming saw cylinder, 14, a yieldable member, or brush, 15, cooperating with the reclaiming cylinder, and a curved shield, 16, which is concentric with the periphery of the reclaiming cylinder, and adjustable to vary the size of a hull discharge opening, 17, for hulls thrown off by the reclaiming cylinder. The lower edge, 18, of the hull board terminates substantially in a horizontal plane passing through the axis of the extracting cylinder 11, and at such distance from the rising side of said extracting cylinder as to provide a relatively wide opening, 19, between the edge of the hull board and the side of the extracting cylinder to permit of the free discharge of hulls, and lock cotton not engaged by the teeth of the extracting cylinder, past the latter.

As heretofore indicated, it is one of the important features of the invention to cause all of the mixed cotton and hulls delivered into the extracting unit A to be brought into contact with the rising side of the extracting cylinder 11 so that all of the cotton, except a certain portion thereof in the form of one-seed locks will be engaged by the saws of the extracting cylinder. This is effected by inclining the hull board 13 in such manner that if its plane were extended it would cut through the periphery of the extracting cylinder.

It is necessary, however, to propel the mixed cotton and hulls at such degree of velocity that they will pass across the opening 19 and be thrown against the rising side of the extracting cylinder. This latter result is obtained by mounting the doffer 12 in cooperative relation with the hull board 13, the upper portion of which is curved, as shown. The upper side of the casing is provided with a vertical portion, 20, located above the doffing cylinder 12, and which acts as an impact plate, or stop, to arrest the motion of the cotton and hulls thrown outward by the cylinder 8 and to cause them to fall upon the doffing cylinder 12 which carries them to the hull board and propels them over the same and across the opening 19 into contact with the rising lower portion of extracting cylinder 11. In this operation, the free hulls, that is, hulls not entangled with the cotton, will tend to fall by gravity through the opening 19 before coming into contact with the teeth of the extracting cylinder, and the same is true of a certain proportion of one-seed locks. Other hulls and one-seed locks, not falling free of the extracting cylinder will be knocked outward by the same. A certain proportion of the hulls, in practice approximately one-half of the total quantity fed into the machine will be carried around with the cotton engaged by the teeth of the extracting cylinder 11, doffed therefrom by the doffer 12, and thrown upward, or outward, against the wall of that portion of the casing enclosing the extracting unit, thence the cotton and hulls fall into the second extracting unit, to be later described.

As thus far described, it will be seen that the provision of the relatively wide opening 19 permits the free escape from the working chamber in front of the extracting cylinder 11 of large hulls and one-seed locks not engaged by the teeth of said cylinder. Such a relatively large opening, however, would necessarily permit of a considerable portion of the cotton escaping with the hulls through said opening were it not for the novel arrangement and incline of the hull board which I employ which causes the cotton and hulls propelled at considerable velocity over the hull board to be directed against the lower portion of the rising side of the extracting cylinder, so that practically all of the free cotton, and a greater, or less, portion of the one-seed locks will necessarily be engaged by the saw teeth of the extracting cylinder.

As heretofore pointed out, it has been found impossible to provide an ideal adjustment of the opening past the extracting cylinder, for the reason that an opening small enough to prevent the escape of cotton results in chocking up the working chamber in front of the extracting cylinder; while if the opening is made large enough to permit the free escape of the large hulls past the extracting cylinder, a certain proportion of cotton inevitably escapes with the hulls.

In the arrangement described it will be seen that I at once avoid choking up the working chamber by permitting the free escape of the largest character of hulls past the extracting cylinder, and avoid the loss of cotton by causing the same to be thrown directly into contact with the rising side of the extracting cylinder, the saw teeth of which cannot fail to engage and carry around not only all the free cotton, but likewise a considerable portion of the one-seed locks of cotton.

The hulls and cotton escaping past the extracting cylinder 11 through the opening 19 fall upon the small reclaiming saw cylinder 14 and are carried thereby under the yielding member, or brush, 15. This brush exerts sufficient pressure upon the surface of the cylinder to force one-seed locks carried under the brush into engagement with the teeth of the saws of the cylinder, and these locks are carried around and doffed from the reclaiming cylinder by the extracting cylinder, which has a surface speed of rotation greater than that of the reclaiming cylinder. The brush 15, however, does not exert sufficient pressure to cause the hulls carried under it to be engaged by the teeth of the reclaiming cylinder, and hence these hulls as they are carried under and beneath the brush are thrown off from the reclaiming cylinder by centrifugal action and fall to the bottom of the casing, whence they are removed from the machine by a trash conveyor, 21.

The second extracting unit, indicated generally by the letter B comprises a hull board member consisting of a screen, 22, and a hull board proper, 23, forming a continuation of the line of the screen, a directing cylinder, 24, rotating in cooperative relation to the screen, a relatively large extracting saw cylinder, 25, a kicker roll, 26, and a doffing cylinder, 27, cooperating therewith, a small reclaiming saw cylinder, 28, a yielding member, or brush, 29, the end of which bears with yielding pressure against the down-going side of the reclaiming cylinder, and a curved shield, 30, circumferentially adjustable with reference to the periphery of the reclaiming cylinder 28, to vary the size of an opening, 31, through which hulls are discharged by the reclaiming cylinder. An impact plate, or stop, 32, is mounted in an inclined relation above the kicker roll 26 in order to direct any hulls, or cotton locks, which may be thrown upward by the kicker roll over onto the directing cylinder 24.

The cotton thrown outward from the first extracting cylinder 11 will ordinarily descend along the vertical side wall, 33, of the portion of the casing inclosing the first extracting unit, and at its lower end the wall 33 is inclined inwardly, as indicated at 34, to direct the falling cotton from the first extracting unit onto the directing cylinder 24 of the second extracting unit. This cylinder is rotated at a relatively high rate of speed and forces the cotton over the screen portion 22 of the hull board member in order to remove small trash from the mixture of cotton and hulls and also operates to propel the stream of cotton at considerable speed over the straight inclined portion of the screen and the hull board proper 23, to cause the same to be thrown against the lower rising side of the extracting cylinder 25. The lower edge of the hull board 23 defines the size of an opening, 35, between the hull board and the rising side of the cylinder, through which hulls, and such locks of cotton as may not initially be engaged by the saw teeth of the extracting cylinder, may freely fall onto the small reclaiming cylinder 28, whence they are carried under the brush 29, the hulls being discharged through the opening 31 by centrifugal action, and the lock cotton being forced into engagement by the brush 29 with the saw teeth of the reclaiming cylinder, and carried around until doffed from the reclaiming cylinder by the extracting cylinder 25, which has a surface speed of rotation greater than that of the reclaiming cylinder.

An important feature of the invention consists of the provision of an independent reclaiming saw cylinder for each extracting cylinder, and a provision of means for independently adjusting the size of the hull discharge openings 17 and 31 from the respective reclaiming cylinders to suit the quantity and character of hulls or hull particles discharged by the two cylinders. In other words, there will ordinarily be a somewhat larger bulk and larger size of hulls and bolls separated by the upper unit, and the hull discharge opening 17 can be of greater width than the opening 31 through which the small hulls, hull particles etc., which are more, or less entangled with the cotton and knocked back by the kicker roll 26 are discharged. Thus, the hull discharge opening 17 from the first reclaiming cylinder may be relatively wide in order to allow of the free discharge of hulls without loss of cotton, while the larger proportion of small hull particles carried around by the second reclaiming cylinder 28, makes it desirable to provide a smaller discharge opening from this reclaiming cylinder in order to prevent the loss of cotton. The relative sizes of the two hull discharge openings, however, will be adjusted in accordance with the character and quantity of hulls to be dealt with in any given case.

Any suitable means may be provided for adjusting the curved shields 16 and 30, but I find a very simple manner of effecting this adjustment is to support the rear end of each shield on a curved support, 36, and to extend a screw-threaded member on each end of a downwardly inclined part, 37, of the shield through an arcuate slot, 38, and to lock each shield in any adjusted position by means of a wing nut, 39, shown by dotted lines, engaging the screw-threaded projection and screwed into contact with each side of the casing of the machine.

It will be understood that all of the parts which have been described above, extend from one side to the other of the casing, and have their bearings, or supports, as the case may be, in the opposite side walls of the casing.

The kicker roll 26 is necessarily employed in connection with the extracting cylinder 25 in order, more particularly, to knock back small hulls and hull particles entangled with the cotton. It is adjusted to rotate in relatively close proximity to the teeth of the extracting cylinder in order to make a substantially complete separation between the cotton and such hulls and hull particles; and this operation can be effected without any danger of choking the working chamber in front of the extracting cylinder because, as in the case of the extracting unit A, the opening 35 is large enough to permit of the free escape of hulls and small lock cotton past the extracting cylinder, and the hulls falling on the reclaiming cylinder 28 are immediately removed thereby and have no longer to be dealt with.

By reason of the close separation effected in the second unit, however, it is necessary, or at least desirable, to increase the extracting capacity by employing a relatively large extracting cylinder.

In a companion application Serial No. 80,240, I have shown and claimed a multi-unit cotton extracting machine in which the upper extracting unit is provided with a hull board which, according to the character of the cotton being treated, is adjusted to permit the escape of hulls only past the extracting cylinder, while the free cotton and cotton locks are engaged by the teeth of the extracting cylinder and carried up and then doffed therefrom. In such an arrangement, only small hulls, or hulls which have been separated from each other, can be discharged past the end of the hull board, whereas, in the present case the upper extracting unit is provided with a reclaiming saw cylinder, which permits the discharge past the extracting cylinder of large hulls, flared bolls and of cotton locks not engaged by the teeth of the extracting cylinder. In this arrangement, the reclaiming cylinder recovers the cotton locks escaping with the hulls past the extracting cylinder, these locks being preferably thereafter doffed from the reclaiming cylinder by the extracting cylinder. In both the upper unit of the present application and in that of my companion application referred to, I omit the use of a kicker roll for knocking back hulls and hull particles from the cotton in order, as explained, to avoid cutting and shaling of the hulls which are to be separated from the cotton in the second unit.

So far as the upper unit is concerned the essential difference between the two arrangements consists in the fact that in the machine of the companion application, I utilize a hull board adjusted to prevent the escape of cotton locks past the extracting cylinder and depend on the extracting cylinder alone to separate these locks from the hulls; whereas in the machine of the present application the hull board acts primarily only as a directing agent for the cotton and hulls; and I designedly make the discharge opening between the lower edge of the hull board and the extracting cylinder so large as to permit of the perfectly free escape of the largest size of hulls, and of cotton locks not engaged by the teeth of the extracting cylinder, through said opening and effect discharge of the hulls from the machine and recovery of the cotton locks by the reclaiming cylinder located below the opening.

To prevent the escape of an abnormal quantity of cotton and cotton locks through the relatively wide hull discharge opening characteristic of the present arrangement, I employ the compensating factors of a hull board inclined toward the periphery of the extracting cylinder, instead of passing under it, and a high-speed directing cylinder co-operating with the hull board and operating to propel the stream of mixed cotton and hulls fed into the machine over the hull board at such velocity that the cotton and a large percentage of the cotton locks are thrown with some force against the teeth of the extracting cylinder, which insures as to practically all of the free cotton and a majority of the cotton locks, immediate engagement therewith by the teeth of the cylinder, while the large hulls readily fall through the opening.

It is characteristic, however, of the upper extracting unit of both this and my companion application, that a single cylinder is used to propel the cotton and hulls over the hull board at one side, while at its other, it functions to doff from the extracting cylinder the cotton and hulls carried up thereby.

The upper extracting unit of both arrangements is susceptible of use by itself as an extracting machine, that is, either may be used wholly independent of the lower extracting unit with which both are shown to be associated in this and my companion application.

Such a machine is extremely simple, comparatively inexpensive, and is very effective in the removal of approximately fifty percent. of the hulls that have been loosened from the cotton by the action of the cleaning cylinder ahead; and the fact that it does not cut or damage the hulls that it fails to separate, makes the machine especially effective as a part of a larger machine involving two or more extracting units which may be combined with it, as shown herein, or used as part of a separate installation.

Owing to the provision of the wide discharge opening and the function of the combined directing and doffing cylinder of propelling the cotton and hulls at such velocity as to cause them to pass across this opening and into engagement with the extracting cylinder, I have elected to claim the construction of the upper extracting unit in the present application.

I claim:

1. In a multi-unit extracting machine for making a plurality of separations of hulls and hull particles from a regulated stream of mixed cotton and hulls fed into the machine, an upper extracting unit having an extracting cylinder and providing an opening of a size to permit the free escape past the cylinder of a portion of the hulls and of lock cotton not engaged by the same, the remaining cotton and hulls being carried up by the extracting cylinder and delivered to a lower unit, a reclaiming cylinder co-operating with said extracting cylinder and functioning to recover cotton locks from the hulls escaping past the extracting cylinder and to discharge the hulls from the machine, a lower extracting unit receiving the cotton and remaining hulls removed from the stream in the first unit by the extracting cylinder thereof, an extracting cylinder in said lower unit, the latter providing an opening for the free escape past its cylinder of hulls and lock cotton not engaged thereby, a separate reclaiming cylinder co-operating with the lower extracting cylinder to recover cotton locks from the remaining hulls escaping past said latter extracting cylinder, and means for delivering the cotton and hulls entering the lower unit from the upper unit to the rising side of the lower extracting cylinder.

2. In a multi-unit extracting machine for making a plurality of separations of hulls and hull particles from a regulated stream of mixed cotton and hulls fed into the machine, an upper extracting unit having an extracting cylinder relatively small in diameter, and providing an opening of a size to permit the free escape past the cylinder of a portion of the hulls and of lock cotton not engaged thereby, the remaining cotton and hulls being carried up by the extracting cylinder and delivered to a lower unit, a co-acting reclaiming cylinder adapted to recover locks of cotton from the hulls escaping past the extracting cylinder and to discharge the hulls from the machine, a lower extracting unit, receiving the remaining hulls and the cotton separated from the stream by the extracting cylinder of the first unit, having a relatively large extracting cylinder, and providing an opening of a size to permit the free escape of hulls and lock cotton not engaged by its cylinder, a co-acting reclaiming cylinder adapted to recover cotton locks from the remaining hulls escaping past the lower extracting cylinder, and means for delivering the cotton and hulls passing into the second unit from the first unit to the rising side of the lower extracting cylinder.

3. In a multi-unit extracting machine for making a plurality of separations of hulls and hull particles from a regulated stream of mixed cotton and hulls fed into the machine, an upper extracting unit having an extracting cylinder and providing an opening of a size to permit the free escape past the cylinder of a portion of the hulls and lock cotton not engaged thereby, the remaining cotton and hulls being carried up by the extracting cylinder and delivered to a lower unit, a co-acting reclaiming cylinder adapted to recover locks of cotton from the hulls escaping past the extracting cylinder and to discharge the hulls from the machine, a lower extracting unit, receiving the cotton and remaining hulls removed from the stream in the first unit by the extracting cylinder thereof, an extracting cylinder in said lower unit, the latter providing an opening for the free escape past its cylinder of small hulls and lock cotton not engaged thereby, a kicker roll co-operating with the lower extracting cylinder defining a relatively narrow space to exclude the passage of small hulls and hull particles with the cotton, a separate reclaiming cylinder co-acting with the lower extracting cylinder to recover cotton locks from the remaining hulls and hull particles escaping past said cylinder, and means for delivering the cotton and hulls entering the lower unit to the rising side of the lower extracting cylinder.

4. In a multi-unit extracting machine for making a plurality of separations of hulls and hull particles from a regulated stream of mixed cotton and hulls fed into the machine, an upper extracting unit having an extracting cylinder, a hull board inclined toward the periphery of said extracting cylinder and with the cylinder defining the size of an opening for the free escape past the cylinder of a portion of the hulls and of lock cotton not engaged by the cylinder, a reclaiming cylinder co-operating with said extracting cylinder to recover cotton locks from the large hulls escaping past the cylinder, a combined directing and doffing cylinder co-operating on one side with said hull board and on the other with said extracting cylinder, a lower unit having an extracting cylinder, a hull board co-operating therewith and with the cylinder defining the size of an opening permitting the free escape of hulls and lock cotton past the cylinder, a kicker roll co-operating with the second-named extracting cylinder, and a reclaiming cylinder for recovering locks of cotton escaping with the hulls past the rising side of said second-named extracting cylinder.

5. In a multi-unit extracting machine, an upper unit having an extracting cylinder, a hull board inclined toward the periphery of said cylinder and with the cylinder defining the size of an opening for the free escape of a portion of the hulls and of cotton locks not engaged by the cylinder, a reclaiming cylinder for recovering cotton locks escaping with the hulls past the extracting cylinder, a combined directing and doffing cylinder co-operating on one side with said hull board and on the other with the extracting cylinder, and operating to propel the mixed cotton and hulls at relatively high velocity over said hull board to cause them to be thrown toward the rising side of said extracting cylinder and to doff from the extracting cylinder hulls and cotton carried up thereby, a lower unit receiving the cotton and remaining hulls doffed from the extracting cylinder of the first unit, an extracting cylinder in said lower unit, a hull board directed toward the periphery thereof and with the same defining the size of an opening for the free escape past the cylinder of hulls and cotton locks not engaged thereby, a separate reclaiming cylinder co-operating with the lower extracting cylinder to recover cotton locks from the remaining hulls escaping past said lower extracting cylinder, means for projecting the cotton and hulls entering the lower unit from the upper unit at relatively high velocity over said hull board and into contact with the rising side of the lower extracting cylinder, and a kicker roll co-operating with the lower extracting cylinder for knocking back hulls and hull particles carried up by said cylinder.

6. In a multi-unit extracting machine, an upper unit having an extracting cylinder and providing an opening of a size to permit the free escape past the cylinder of a portion of the hulls and of lock cotton not engaged by the same, the remaining cotton and hulls being carried up by the extracting cylinder and delivered to a lower unit, a reclaiming saw cylinder for recovering locks of cotton escaping with the hulls past said extracting cylinder and having a hull discharge opening associated therewith through which hulls are discharged from the machine by the reclaiming cylinder, a lower extracting unit receiving the cotton and remaining hulls removed from the stream in the first unit by the extracting cylinder thereof, and having an extracting cylinder and providing an opening of a size to permit the free escape past said cylinder of hulls and lock cotton not engaged thereby, a reclaiming cylinder associated with said lower extracting cylinder for recovering cotton locks escaping with the hulls past the same, a hull discharge opening associated with said reclaiming cylinder, a kicker roll co-operating with said lower extracting cylinder and means for independently adjusting the size of the hull discharge opening of each reclaiming cylinder.

7. In a multi-unit extracting machine, an upper and lower extracting unit, means in the upper unit for effecting a separation and discharge from the machine of a portion of the hulls from a stream of mixed cotton and hulls fed into the machine, an extracting cylinder operating independently to continuously and uninterruptedly remove the balance of said hulls together with cotton from said stream, means for doffing from the extracting cylinder the cotton and hulls removed thereby from said stream, and delivering same into said lower unit, an extracting cylinder in said lower unit, having a hull discharge opening extending past the same, means for propelling said cotton and hulls at high velocity across said hull discharge opening and into contact with the rising side of said lower extracting cylinder, a reclaiming saw cylinder for recovering cotton locks escaping with the hulls through said opening, and a kicker roll co-operating with said extracting cylinder for knocking back hulls and hull particles from the cotton carried under the same by the lower extracting cylinder.

8. In a multi-unit extracting machine, an upper unit having an extracting cylinder, past which extends a relatively wide opening, means for projecting at relatively high velocity a stream of mixed cotton and hulls fed into the machine across said opening and into contact with the rising side of the extracting cylinder, whereby a portion of the hulls will be discharged through said gap and the remaining portion will be carried up by the extracting cylinder together with cotton engaged by the saws thereof, a reclaiming cylinder for recovering cotton locks escaping through said opening with the hulls and for discharging the hulls from the machine, means for doffing the cotton and remaining portion of the hulls from said extracting cylinder and delivering such remaining portion of the hulls in an intact condition along with the cotton to the lower unit, means in said lower unit including an extracting cylinder and a kicker roll for effecting a separation between said cotton and the remaining portion of said hulls, and a reclaiming cylinder co-operating with said lower extracting cylinder for recovering cotton locks not initially engaged by said cylinder.

9. A cotton extracting machine for separating cotton from a stream of mixed cotton and hulls fed into the machine comprising an initial extracting cylinder past which a hull discharge opening extends at the rising side thereof, and a combined directing cylinder and doffer operating at one side to direct the incoming stream of cotton and hulls across said opening onto the extracting cylinder and at its other side to doff cotton from the extracting cylinder.

10. A cotton extracting machine for separating cotton from a stream of mixed cotton and hulls fed into the machine comprising, in combination, an extracting cylinder, a hull board defining with the cylinder the size of an opening past the cylinder for the free escape of hulls and of cotton locks not engaged by the teeth of the cylinder, and a combined directing cylinder and doffer operating on one side to propel the stream of cotton and hulls over said hull board at a velocity to cause the cotton and cotton locks to cross said opening and be thrown into engagement with the rising side of the extracting cylinder and the hulls to discharge through said opening, and on its other side to doff cotton from said extracting cylinder.

11. A cotton extracting machine for separating cotton from a stream of mixed cotton and hulls fed into the machine comprising, in combination, an extracting cylinder, a hull board directed toward the periphery of said extracting cylinder, its lower end defining with the cylinder the size of an opening past the cylinder of a size to permit the free escape of hulls therethrough, and a combined directing cylinder and doffer operating on one side to propel the mixed cotton and hulls over said hull board at a velocity to cause the free cotton and cotton locks to cross said opening and to be thrown into engagement with the rising side of the cylinder and the hulls to discharge through said opening, and on its other side to doff cotton from the extracting cylinder.

12. A cotton extracting machine for separating cotton from a stream of mixed cotton and hulls fed into the machine comprising, in combination, an extracting cylinder, a hull board directed toward the periphery of said cylinder, its lower end terminating in substantially the horizontal plane of the axis of the cylinder and with the cylinder defining the size of a relatively large opening past the cylinder for the free escape of hulls, and a combined directing cylinder and doffer operating on one side to propel the stream of cotton and hulls over the hull board at a velocity to cause the free cotton and cotton locks to cross said opening and be thrown into engagement with the rising side of the extracting cylinder and the hulls to discharge through said opening, and on its other side to doff cotton from the extracting cylinder.

JOHN E. MITCHELL.